(12) United States Patent
Klingensmith et al.

(10) Patent No.: US 7,221,261 B1
(45) Date of Patent: May 22, 2007

(54) SYSTEM AND METHOD FOR INDICATING A CONFIGURATION OF POWER PROVIDED OVER AN ETHERNET PORT

(75) Inventors: James B Klingensmith, San Jose, CA (US); Brent Dimick, San Carlos, CA (US); Elton Armstrong, Mountain View, CA (US)

(73) Assignee: Vernier Networks, Inc., Mountain View, CA (US)

( * ) Notice: Subject to any disclaimer, the term of this patent is extended or adjusted under 35 U.S.C. 154(b) by 165 days.

(21) Appl. No.: 10/953,407
(22) Filed: Sep. 29, 2004

Related U.S. Application Data

(60) Provisional application No. 60/508,724, filed on Oct. 2, 2003.

(51) Int. Cl.
*G05B 11/01* (2006.01)
(52) U.S. Cl. ............... 340/310.11; 340/538; 370/254; 370/395.1; 379/413; 700/297; 710/300; 713/300
(58) Field of Classification Search ............... 340/509, 340/517, 538, 540, 659, 660, 693.1, 310.16, 340/286.02; 370/466; 455/402, 67.11; 174/113 R; 702/60; 709/250; 324/539; 714/14, 22; 713/340, 300
See application file for complete search history.

(56) References Cited

U.S. PATENT DOCUMENTS

| | | | | |
|---|---|---|---|---|
| 5,168,171 A * | 12/1992 | Tracewell | ..................... | 307/64 |
| 5,577,023 A * | 11/1996 | Marum et al. | .............. | 370/225 |
| 6,633,998 B1 * | 10/2003 | Lau | ............................ | 714/22 |
| 6,747,874 B2 * | 6/2004 | McKinnon et al. | ......... | 361/724 |
| 2001/0027055 A1 * | 10/2001 | Laity et al. | ................ | 439/490 |
| 2003/0099076 A1 * | 5/2003 | Elkayam et al. | .............. | 361/90 |
| 2003/0107269 A1 * | 6/2003 | Jetzt | ............................. | 307/4 |
| 2003/0108018 A1 * | 6/2003 | Dujardin et al. | ............ | 370/338 |
| 2004/0164619 A1 * | 8/2004 | Parker et al. | ................. | 307/80 |
| 2005/0023026 A1 * | 2/2005 | Chen | ........................ | 174/74 R |
| 2006/0063509 A1 * | 3/2006 | Pincu et al. | ................ | 455/402 |

* cited by examiner

*Primary Examiner*—Brent A. Swarthout
(74) *Attorney, Agent, or Firm*—Innovation Partners; Charles E. Gotlieb

(57) ABSTRACT

A system and method indicates the configuration of power to be provided over Ethernet cabling.

20 Claims, 4 Drawing Sheets

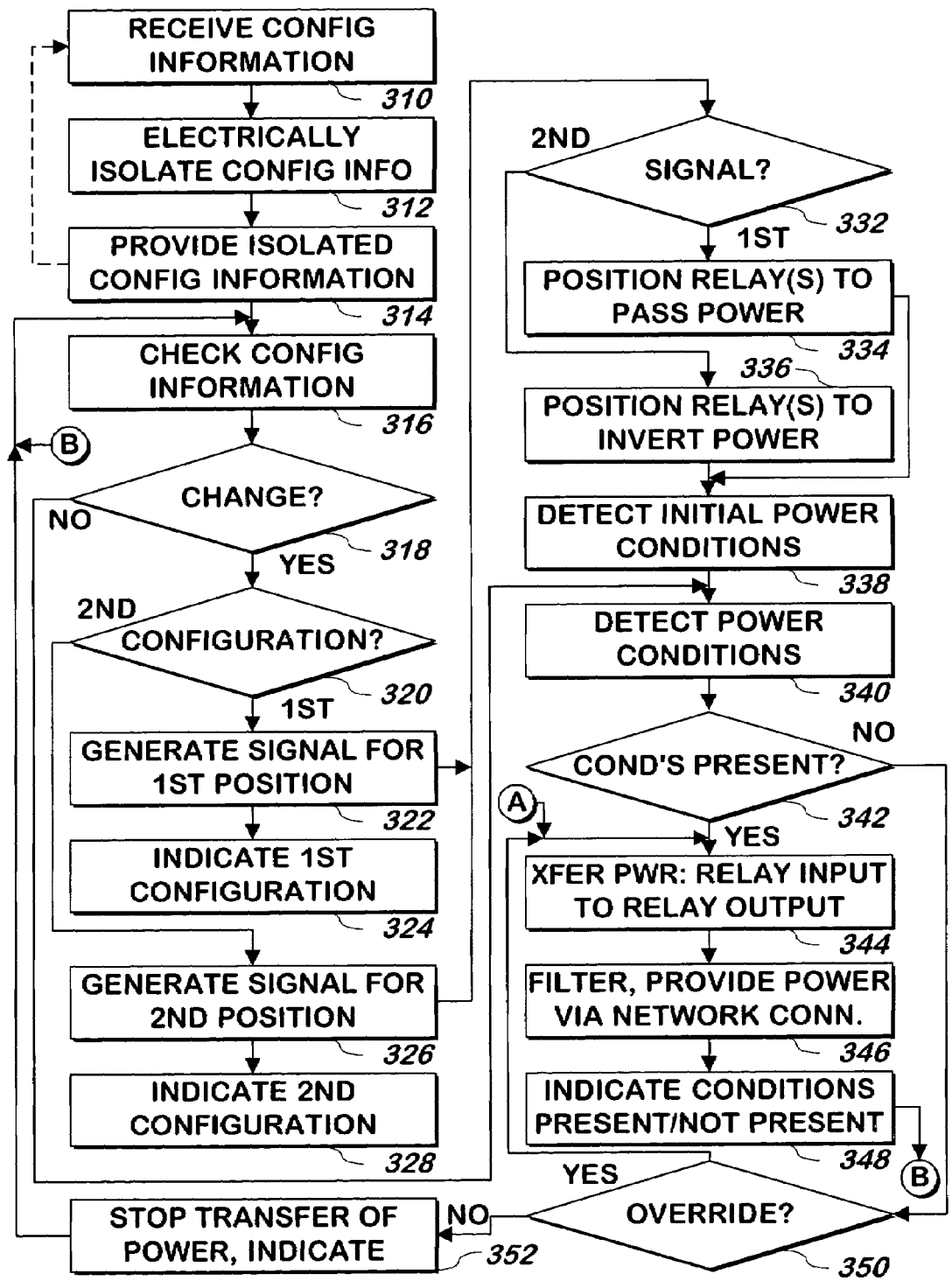

SYSTEM AND METHOD FOR INDICATING A CONFIGURATION OF POWER PROVIDED OVER AN ETHERNET PORT

RELATED APPLICATIONS

This application claims the benefit of U.S. Provisional application Ser. No. 60/508,724 entitled "Method and Apparatus for Power Over Ethernet" filed on Oct. 2, 2003 by Brent Dimick, Bruce Klingensmith, and Elton Armstrong, having the same assignee as the present application; and is related to U.S. patent application Ser. No. 10/953,431, entitled, "SYSTEM AND METHOD FOR PROVIDING DIFFERENT POLARITIES OF POWER SUPPLIED OVER ETHERNET CABLES", and U.S. patent application Ser. No. 10/953,408, entitled, "SYSTEM AND METHOD FOR SAFELY CONTROLLING, AND RECEIVING STATUS OF, POWER OVER ETHERNET" now U.S. Pat. 7,187,268 each filed concurrently herewith by the same inventors and having the same assignee as the present application, and all of the above-referenced applications are incorporated by reference in their entirety.

FIELD OF THE INVENTION

The present invention is related to power control systems and more specifically to power control systems for power over Ethernet cables.

BACKGROUND OF THE INVENTION

Conventional Ethernet cables employ eight wires, only four of which are used to carry communication signals. The other wires are available for other uses. One such use is to carry power from one Ethernet-connected device to another such device. This allows the device receiving the power to avoid the need to obtain power from a separate source.

Several standards have been developed for supplying power over Ethernet cables. One standard is the conventional 802.3af proposed by the IEEE, which supplies 48 volt power over at least two of the wires, using either of the two polarities, such as +48 volts or −48 volts. The IEEE is an organization composed of multiple member organizations that develop standards, among other things. Another standard for supplying power over Ethernet cables has been promulgated by Cisco Systems, Inc., and supplies −48 volt power. Cisco Systems, Inc., is a corporation that supplies communications equipment, including Ethernet processing equipment. The systems drawing such power are typically compatible with only one such power polarity.

As described herein, power having either type of polarity may be supplied via Ethernet ports by configuring the port. Once configured, however, the port will be incompatible with systems drawing power having the other type of polarity. If the port is provided in a location inaccessible to, or merely different from, the location at which configuration information is entered, it may be impossible or inconvenient to determine the polarity of the supplied power for which the port has been configured when the user is near the port. What is needed is a system and method that can indicate near an Ethernet port the polarity of supplied power for which the Ethernet port has been configured.

SUMMARY OF INVENTION

A system and method receives configuration information about power to be provided over a communication network connector containing communication leads and power leads and provides status information about the configuration at least near the communication network connector. The communication network connector may be a conventional RJ-45 connector or another conventional connector. The communication leads may communicate conventional Ethernet signals or other conventional communication network signals. The status information may be provided using a lamp, such as one or more conventional LEDs, and may be provided by flashing at least one of the one or more LEDs, changing the color of one or more LEDs or signaling via one or more solid color LEDs, or may be provided using other methods such as via tones from a speaker. The configuration information distinguishes between a power configuration specified by an industry standards organization and a power configuration specified by a corporation.

DETAILED DESCRIPTION OF A PREFERRED EMBODIMENT

Figure 1:
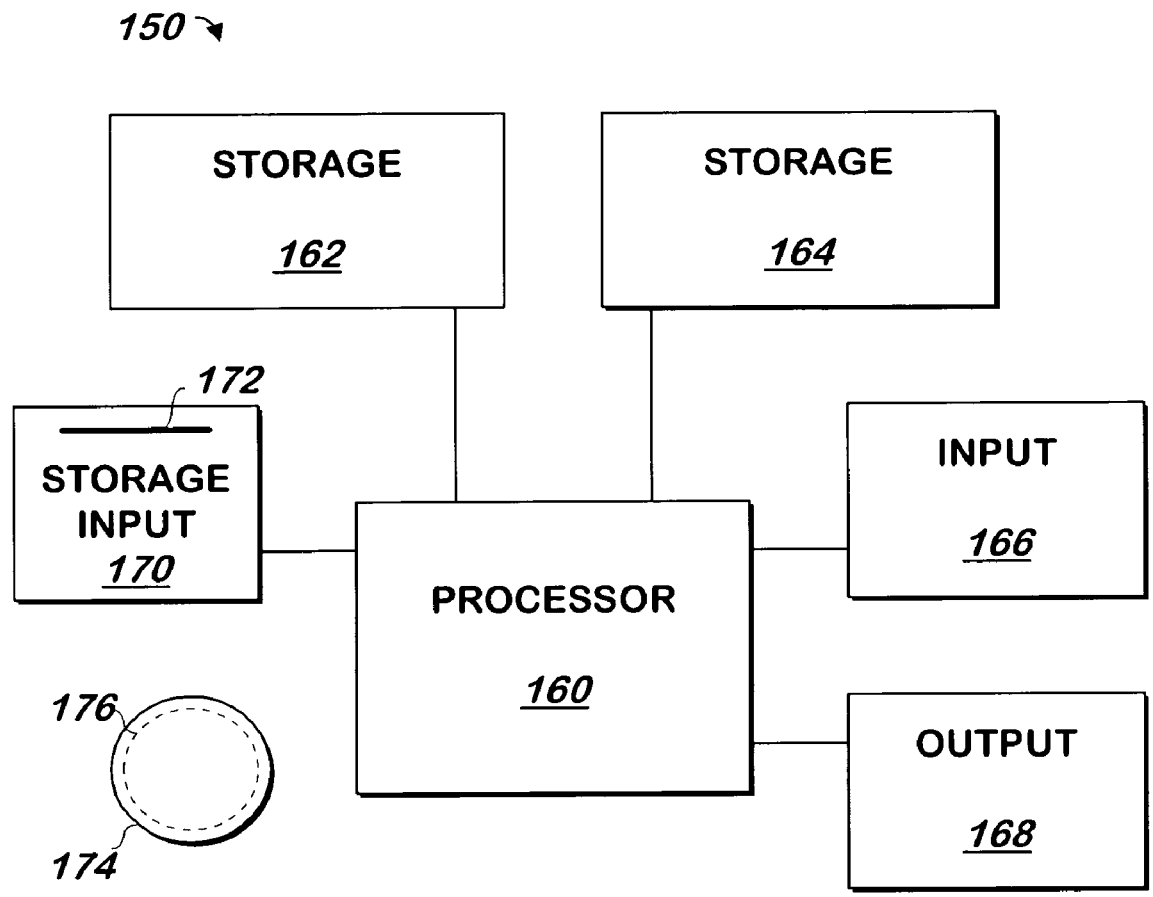
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif.; a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or the FreeBSD operating system commercially available from the website of FreeBSD.org; or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
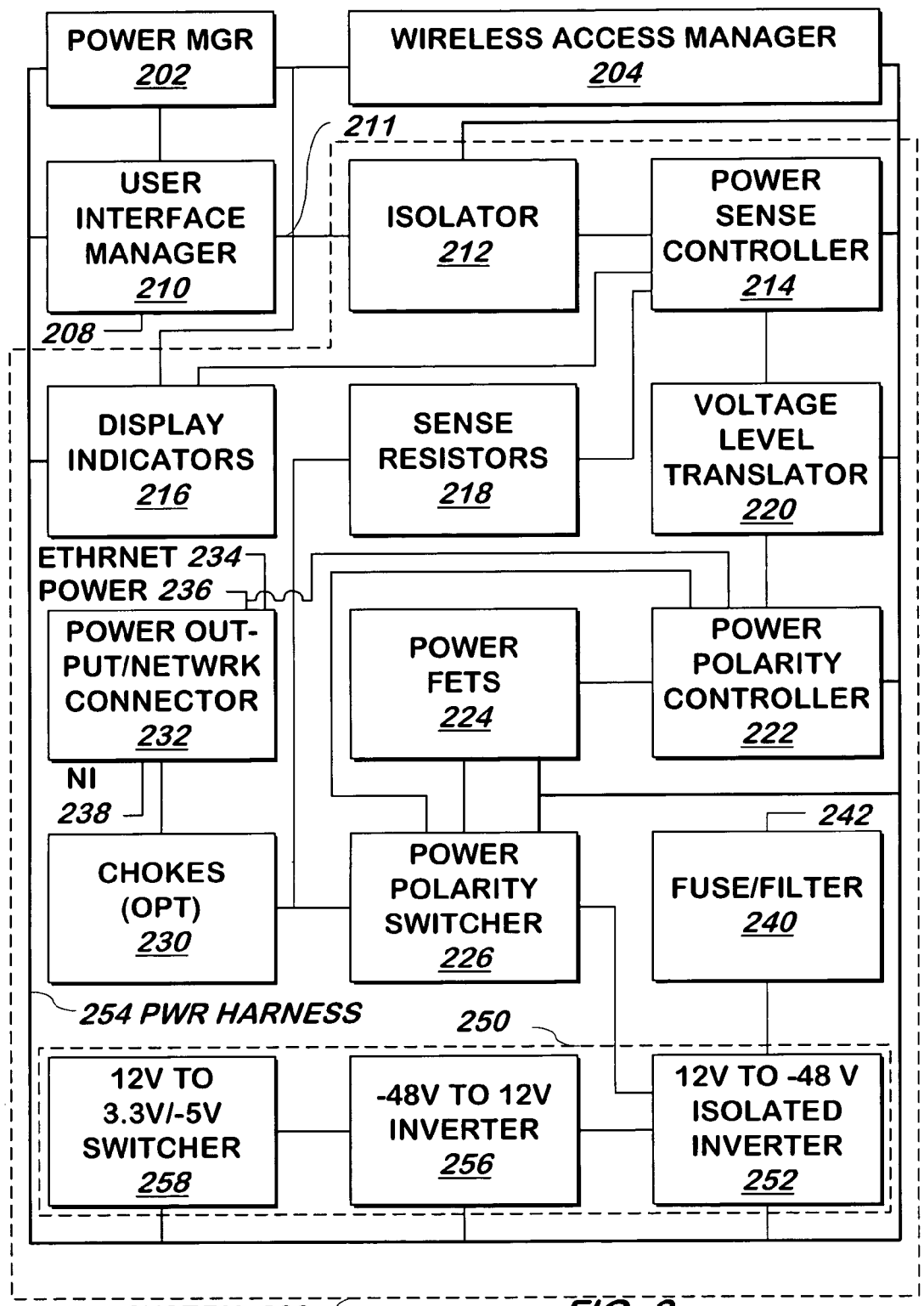
FIG. 2 is a block schematic diagram of a system for configuring and providing power to a cable used for an Ethernet connection and for providing information about such configuration according to one embodiment of the present invention.

Referring now to FIG. 2, a system for configuring and providing power to a cable used for an Ethernet connection and for providing information about such configuration is shown according to one embodiment of the present invention.

Power Conversion

Power is received from a conventional power supply, such as a 12 volt power supply, at input 242 to fuse/filter 240, which optionally filters the power via conventional capacitors and passes the power through fused links to voltage converter 250.

Voltage converter 250 isolates the power and converts it to any various voltages that may be required by components of system 200 and other devices to which system 200 will supply power. In one embodiment, voltage converter 250 contains 12 volt to −48 volt isolated inverter 252, −48 volt to 12 volt inverter 256 and 12 volt to 3.3 volt and −5 volt switcher 258.

12 volt to −48 volt isolated inverter 252 receives the power from fuse/filter 240, isolates it and converts it to −48 volts DC, and supplies the isolated −48 volt DC power to power harness 254, power polarity switcher 226 and to −48 volt to 12 volt inverter 256.

−48 volt to 12 volt inverter 256 receives the −48 volt isolated power and converts it to 12 volt power, and provides the 12 volt power to power harness 254 and to 12 volt to 3.3 volt and −5 volt switcher 258. 12 volt to 3.3 volt and −5 volt switcher 258 receives the 12 volt power and converts it to 3.3 volts, which it supplies to harness 254, and −5 volts, which it also supplies to harness 254.

In one embodiment, the outputs of 12 volt to −48 volt isolated inverter 252, −48 volt to 12 volt inverter 256 and 12 volt to 3.3 volt and −5 volt switcher 258 are coupled to components of system 200 that draw power, via power harness 254 shown in the figure as a single cable to avoid cluttering the Figure. Power manager 202, user interface manager 210 and wireless access manager 204 may receive power from power harness 254 or they may draw power from the same source as supplies power to power input 242 or from a different source.

As used herein, the term "power" includes power such as would be supplied from a conventional power supply and that is used to operate a system, such as by connecting one lead to ground and another lead to the Vcc input of a conventional integrated circuit, and excludes communication or other signals that only communicate information.

Configuration of Polarity

A user may configure the system 200 to provide power over Ethernet using one of two polarities: one polarity provides direct current at −48V and the other polarity provides direct current at +48V. To configure the system, the user communicates with user interface manager 210 via input/output 208, which may be coupled to a conventional keyboard/monitor/mouse or other set of input and/or output devices, such as a personal computer system, none of which are shown. User interface manager 210 may have suitable interfaces for communication with such input and/or output devices, and/or may include or be coupled to a conventional Ethernet interface running conventional protocols such as TCP/IP to allow the user to communicate with user interface manager 210 via a network-coupled personal computer running a browser. In this case, user interface manager 210 provides the user interface via one or more web pages.

User interface manager 210 prompts the user for the power configuration to be used to supply power and receives the requested indication of the power configuration, all via input/output 208 as described above. In one embodiment, there may be multiple Ethernet ports through which power can be provided, and if each port may supply power using a different configuration, the indication also indicates an identifier of the port for which the configuration corresponds. User interface manager 210 internally stores the indication of the power configuration (and, optionally, the port identifier), and provides the indication (and optionally the port identifier) to isolator 212.

Isolator 212 contains one or more conventional isolators such as a one or more opto-isolators (e.g. Model HCPL-063N receiving signals from port 211 and HCPL-063L providing signals to port 211, both available from Agilent Technologies of Palo Alto, Calif.), and serves to electrically isolate user interface manager 210, power manager 202, wireless access manager 204 and other equipment that is connected to system 200 via port 211 to ensure that power disruptions in system 200 are not transmitted to devices 210, 204, 202 or other devices that may be coupled to system 200 via port 211. Isolator 212 provides to power sense controller 214 the indication of the power configuration (and the optional port identifier) it receives from user interface manager 210.

In one embodiment, power sense controller 214 receives the indication of the power configuration and provides a visual display of the power configuration using display indicators 216. Display indicators 216 may include conventional display indicators such as one or more light emitting diodes (LEDs) or other similar status indicators. In one embodiment, status of the power configuration may be provided by illuminating the display indicator for the corresponding port in a different color to indicate the polarity of that port, such as yellow for Cisco or IEEE-compatible −48 volt power and green for IEEE-compatible +48 volt power, although other methods of indicating the polarity may be used. In one embodiment, until the power conditions have been detected for a port as described below, power sense controller 214 flashes the display indicator for that port.

In one embodiment, display indicators 216 include one or more conventional LEDs or other indicators that are physically near (e.g. within 2 inches) the opening of power output/network connector 232. In one embodiment, display indicators are also used to display the status of the network connection occurring through the Ethernet leads 234 of power output/network connector 232 that is described in more detail below, and in another embodiment, they are provided in addition to those used for status. In such other embodiment, display indicators used for network status are provided adjacent to the network connector 232 and those used to display power configuration are provided further away from the network connector 232 for which status is being displayed, but still within a few inches of the network connector 232. Such network status may be provided to display indicators 216 by wireless access manager 204, described in more detail below.

Power sense controller 214 uses the indication of the power configuration it receives from isolator 212 to determine in which position the power polarity switcher 226 should be held. Power sense controller 214 determines that power polarity switcher 226, described in more detail below, should be in one position if an indication of one type of power configuration is received, and determines that power polarity switcher 226 should be in another position if the other type of power configuration is received. Power sense controller 214 then provides to power polarity controller 222 a polarity signal (indicating either positive or negative polarity) corresponding to the determination it makes as described above. In the event that ports may be individually configured, power sense controller 214 provides the polarity signal to cause power that can be applied to each port to match the configuration indicated for that port.

In one embodiment, power sense controller 214 is a conventional microcontroller, such as the model PIC 16F872 commercially available from Microchip, Inc. of Chandler, AZ, and power polarity controller 222, described in more detail below, is a conventional quad network power controller, such as the model LTC 4255 commercially available from Linear Technology of Milpitas, CA. In such embodiment, the voltages of each of these devices is incompatible, and so voltage level translator 220 performs the voltage translation between such devices.

Voltage level translator 220 performs translation of signals from power sense controller 214 to and from power polarity controller 222. To translate from power sense controller 214 to power polarity controller 222, voltage level translator 220 connects signals from the power sense controller 214 to the gate of a conventional n-FET, and connects −5.0 volts to the source of the n-FET. The drain is coupled to the input of power polarity controller 222 via a 1K-Ohm resistor. A 665 Ohm resistor is also coupled between +3.3V and the input of power polarity controller 222.

Voltage level translator 220 performs translation of signals from power polarity controller 222 to power sense controller 214 by coupling output signals from power polarity controller to the gate of a conventional p-FET, +3.3 volts to the source of the p-FET and coupling the drain of the p-FET to the input of power sense controller 214 via a 665 Ohm resistor. The input of power sense controller 214 is also coupled to −5.0 volts via a 1K resistor.

Power polarity controller 222 receives the polarity signal for a given port from power sense controller 214 and provides the proper signal to cause power polarity switcher 226 to cause the polarity of any power that can be supplied to that port to be either positive or negative, matching that indicated by the polarity signal received. In response to this signal, for each port, power polarity switcher 226 configures itself to enable itself to either pass the power it receives from 12 volt to −48 volt isolated inverter 252 with the polarity intact, or reversed, so that either 48 volt or −48 volt power is supplied to its outputs corresponding to that port based on the signal received from power polarity controller 222 for that port. In one embodiment, power polarity switcher 226 contains one or more conventional relays and need not contain more than one, because a single multicontact relay may be used.

This process will cause the polarity of the power that can be supplied by power polarity switcher 226 for each port to be configured to match the polarity requested by the user for that port as described above, however it does not cause such power to be supplied from power polarity switcher 226 to power output/network connector 232. The process of supplying the power having the polarity configured as described above will now be described.

Application of Power to Ports

In one embodiment, power polarity controller 222, power sense controller 214 or both, monitors the power connection at power output/network connector 232 to determine whether a device capable of properly drawing power from the Ethernet cable coupled to power output network connector 232 is coupled to power output network connector 232. Such monitoring includes receiving signals, such as a valid detection signature, complying with the 802.3af specification that indicate that the device can receive power from an Ethernet cable, and may include checking for a lack of error conditions, such as open or shorted circuits as specified by the 802.3af specification. These conditions are collectively referred herein as the "power conditions".

In one embodiment, power polarity controller 222 performs this detection and signals power sense controller 214 with an indication for each port as to whether a device was detected on that port that can properly draw power, for example, because the power conditions (valid signature, no errors) are all present. In another embodiment, power sense controller 214 performs this function by sensing via sense resistors 218 and provides and receives its own indication for each port. In still another embodiment, both techniques are used.

If the indication is received that a device that can properly draw power is detected on a port, power sense controller 214 causes the indicator of display indicators 216 that corresponds to that port to illuminate steadily in the color indicating the configuration, such as yellow for Cisco or IEEE-compatible −48 volt power and green for IEEE-compatible +48 volt power. If the indication is received that a device that can properly draw power is not detected on a port, power sense controller 214 causes display indicators 216 to flash in the color indicating the configuration, such as yellow for Cisco or IEEE-compatible −48 volt power and green for IEEE-compatible +48 volt power.

In the embodiment in which display indicators 216 are used to display both power and network status, power configuration status is provided as described above when no Ethernet connection is detected by wireless access manager 204. When such connection is detected, wireless access manager 204 signals power sense controller 214 to cease its display of the power configuration, and power sense controller complies. Wireless access manager 204 then displays network status in a conventional manner using display indicators 216. When the Ethernet connection is terminated, for example, because the Ethernet cable is removed from power output/network connector 232, or when wireless access manager 204 identifies that no such connection is present as it monitors the system as described above, wireless access manager 204 signals power sense controller 214 to resume or continue its display of the power configuration as described above and power sense controller 214 complies.

When the power conditions are all favorably detected on a port, power sense controller 214 signals power polarity controller 222 for that port. Power polarity controller 222 signals power polarity switcher 226 to supply the power to the indicated port when so signaled by power sense controller 214.

The signal received from power sense controller 214 instructing power polarity controller 222 to supply the power to the indicated port causes power polarity controller 222 to signal power FETs 224 to switch on for the indicated port. Power FETs 224 are conventional field effect transistors that can provide higher current than what may be available from power polarity controller 222 if necessary to drive power polarity switcher 228. When power FETs 224 receive the signal described above for a particular port, power FETs 224 provide sufficient power to cause power polarity switcher 228 to supply at the output of power polarity switcher 228 the power with voltage having the polarity configured as described above.

When powered by power FETs 224 corresponding to a port, power polarity switcher 228 provides the power with the polarity configured as described above to the indicated port of power output/network connector 232, which may contain one or more conventional Ethernet connectors, (e.g. one for each port). Power may be in the form of 48 volts or any other voltage, and as described above, may have either of the two polarities configured as described above, one polarity conforming to the IEEE standard described above, the IEEE standard having been developed by agreement of multiple organizations including multiple companies, and the other polarity conforming to the IEEE standard or to a standard developed by Cisco Systems, Inc. of San Jose, Calif. or another one or more corporations selling network equipment.

Power polarity switcher 228 provides the power to certain Ethernet cable leads (in one embodiment, these leads are the leads 236 not used for networking communication signals although in other embodiments, the leads are also used for signals) in power output/network connector 232 via optional chokes 238 (which can be used to reduce EMI emissions). In one embodiment, power output/network connector 232 contains, for each of four parts, a conventional RJ-45 or other conventional connector, such as one that can also be used to provide Ethernet signals, with leads 234 in each connector used to provide conventional communication signals, such as networking signals, which may be conventional Ethernet signals, received at network input 238, as well as leads 236 in the same connector used to provide power. For each port, the power and networking signals are provided via a single cable plugged into power output/network connector 232 such as a cable of eight conductor, twisted pair wiring.

The above description was applicable to the case in which the valid detection signature and the lack of errors described above were detected by power polarity controller 222. If a valid detection signature is not present or other errors are detected for a given port, power polarity controller 222 will indicate the problem and the port to power sense controller 214, which will not direct power polarity controller 222 to apply power to power FETs 224 for that port.

In one embodiment, the power conditions are monitored at power leads 236 for each port as described above, and power sense controller 214, power polarity controller 222, or both, continue to monitor each port for open, short, or other error conditions. In the event that an error condition on a port is detected after power has been configured and supplied as described above, either power polarity controller 222 signals power sense controller 214 with an indication of the port, or power sense controller 214 performs such detection of any such error conditions for each such port. As a result, power sense controller 214 signals power polarity controller to stop applying power to power FETs 224 for that port, and power polarity controller 222 complies. This causes power polarity switcher 226 to disconnect the power it supplies to the corresponding port of power output/network connector 232 as described above.

As described above, power will be applied to power leads 236 for a port if the power conditions are met on that port, such conditions including detecting a valid power over Ethernet detection signature and not detecting error conditions such as short or open circuits and power will be maintained on that port if no error conditions are detected. In one embodiment, a user may cause power to be applied to, and/or maintained on, power leads 236 for a port even if some or all of the power conditions are not met on that port. Such a capability may be helpful in troubleshooting or when the conditions are thought either to be present, in spite of the fact that they have not been detected, or when the condition is not thought necessary to the application of power to power leads 236. In such embodiment, a user may indicate to user interface manager 210 to ignore the lack of one or more (or all) of the power conditions for some or all ports, and user interface manager 210 communicates to power sense controller 214 such indication and the one or more port identifiers for which the indication corresponds.

If power sense controller 214 detects, and/or receives an indication from power polarity controller 222 that one or more of the power conditions has not been met, power sense controller 214 will only instruct power polarity controller 222 not to cause power polarity switcher 226 to apply or maintain power on a port as described above if the conditions that have not been met for that port correspond to those for which the user indicated were OK to ignore for that port. The indication to ignore may also apply to all conditions for a port, in which case, power sense controller 214 will instruct power polarity controller 222 to supply or maintain power for that port as described above even if none of the power conditions are detected by power sense controller 214 or power polarity controller 222.

In one embodiment, user interface manager 210 internally stores in nonvolatile memory the configuration information received as described above. User interface manager 210 can utilize such information when it is restarted, for example, after a power failure, or may display the information and allow the user to apply it to the port or change it.

As noted above, power output/network connector 232 may include more than one physical connector, referred to herein as a "port". For example, power output/network connector 232 may include four RJ-45 connectors, each of which may contain Ethernet leads 234 and power leads 236. In such embodiment, the monitoring and control of the power described above is performed on a per-physical-connector basis. For example, if the power conditions are not detected in one connector, but detected in the others, power is not applied only to that one connector, but is applied to the other connectors.

Other Components

Wireless access manager 204 is a device that processes Ethernet communication signals and communicates with wireless devices, such as the conventional Vernier AM6500 commercially available from Vernier Networks, Inc. of Mountain View, Calif. In one embodiment, wireless access manager 204 provides Ethernet communication networking signals, such as corresponding to Ethernet communication networking signals it receives, to network input leads 238 of power output/network connector 232 via an internally located conventional Ethernet hub or switch. Network input leads 238 are coupled to Ethernet leads 234, which supply communication signals to an Ethernet cable plugged into power output/network connector 232 and may be coupled to a conventional Ethernet switch, hub or other Ethernet equipment. The communication leads from wireless access manager 204 are coupled to power output/network connector 232 via a connection not shown to avoid cluttering the Figure.

The flow of information regarding power over Ethernet may be in the reverse direction in addition to, or instead of, the direction described above through isolator 212. For example, if power sense controller 214 detects or receives an indication that one or more of the power conditions are not being met for a given port as described above, power sense controller 214 may provide this information to isolator 212, which electrically isolates the information and provides it to power manager 202, which generates and provides reports to a user via user interface manager 210, and can indicate to other equipment such as wireless access manager 204 to take certain steps in response to the power information it receives. Such steps may include saving information to nonvolatile storage that is part of the other equipment such as wireless access manager 204 to allow for an orderly shutdown in the event of an error.

Figure 3B:
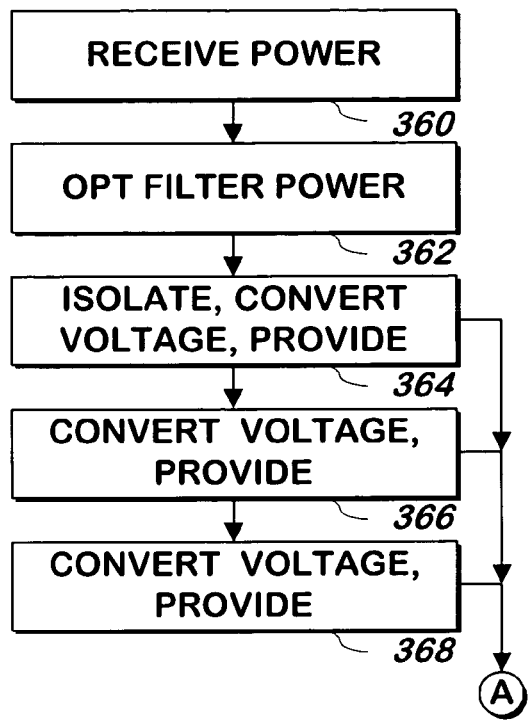
FIG. 3, consisting of FIGS. 3A and 3B, is a flowchart illustrating a method of configuring and providing power to a cable used for an Ethernet connection and for providing information about such configuration according to one embodiment of the present invention.
Figure 3:
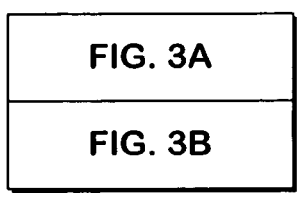

Referring now to FIG. 3 (which is made up of FIGS. 3A and 3B), a method of configuring and providing power provided to a cable used for an Ethernet connection and for providing status information about such configuration is shown according to one embodiment of the present invention. Although Ethernet is used as described herein, any communication protocol such as a networking protocol may be used by the present invention. FIG. 3 illustrates the method for a single port, and may be performed for each of several ports.

Referring now to FIG. 3A, configuration information is received 310 as described above. The configuration information is electrically isolated 312 and provided 314. The configuration information provided in step 314 is checked 316 to determine whether it corresponds to a first or a second configuration. If a change to the configuration of power to be supplied to any port has been made 318, the method continues at step 320 and otherwise 318, the method continues at step 340.

At step 320, if the configuration information corresponds to a first configuration 320, such as a configuration corresponding to a communication industry-developed standard, a signal that will cause one or more relays or other similar switching devices to be placed into a first position is provided 322 and the first configuration is indicated 324, such as by using the LEDs conventionally associated with status of the Ethernet connection at or near the connector from which power for that connection will be received or other LEDs as described above. The method continues at step 332.

If the configuration information corresponds to a second configuration 320, such as a configuration corresponding to a proprietary-developed standard, such as one developed by a single communications company, a signal that will cause one or more relays or other switching devices to be placed into a second position is provided 326 and the second configuration is indicated 328, such as by using the LEDs conventionally associated with status of the Ethernet connection at or near the connector from which power for that connection will be received. The method continues at step 332.

In one embodiment, steps 324 and 328 may be performed by flashing (or not flashing) such LEDs in a particular pattern, or using a particular flashing sequence (that does not indicate communications information flowing over the port used to receive the power) or color or set of colors to indicate the configuration and to indicate that the power conditions have not been detected as described above.

If the signal from steps 322 or 326 corresponds to the first position 332, relays or other switching devices are positioned 334 to pass power with the polarity unchanged and the method continues at step 364; and otherwise 332, the relays or other switching devices are positioned 336 to pass power with the polarity reversed (or vice versa).

Initial power conditions are detected 338 as described above. Such initial conditions are conditions detected before, or soon after, power is initially applied and may include the existence of a valid power over Ethernet detection signature or other conditions described in the power over Ethernet specification as described above. Other power conditions may be detected 340, such as the nonexistence of short circuits or open circuits or other conditions that indicate that a device is capable of properly drawing power over an Ethernet cable. If the conditions detected in steps 338 and 340 are present 342, the method continues at step 344 and otherwise 342 the method continues at step 350. At step 344, power, received as described in steps 360–370 of FIG. 3B and configured as described above, is transferred from the input to the output of a relay or other device. Step 344 may include boosting a signal using a transistor such as a conventional FET that supplies power to the relay or other device as described above.

The power transferred in step 344 may be filtered and provided to a network connector, such as a conventional RJ-45 Ethernet connector that may also simultaneously carry networking signals, as described above 346. An indication that power is being supplied to the network connector and that the power conditions are present is provided, such as via an LED as described above 350 and the method continues at step 316.

At step 350, if any of the conditions detected in steps 338 or 340 are not present 342, if an override indication for the condition not present or for all conditions has been received as described above, the method continues at step 344 and otherwise 350, the transfer of power through the relay or other device is discontinued and an indication of the power configuration and the fact that power is not being provided or that the power conditions are not met is provided as described above 352. In one embodiment, if the yes branch of step 350 is taken, the indication is changed to indicate that the power conditions are not being met in step 348 instead of indicating that the conditions are present as described above.

Referring now to FIG. 3B, power is received 360 and filtered 362, isolated and its voltage may be converted and the converted, isolated voltage provided 364, and the isolated, converted power may have its voltage converted and provided 366 and converted and provided again 368 as described above.

The power, isolated, filtered, converted, and provided in any of steps 360–368, such as that provided in step 364, is provided to relays or other switching devices configured in steps 334 or 336 and the method continues at step 344.

Figure 4:
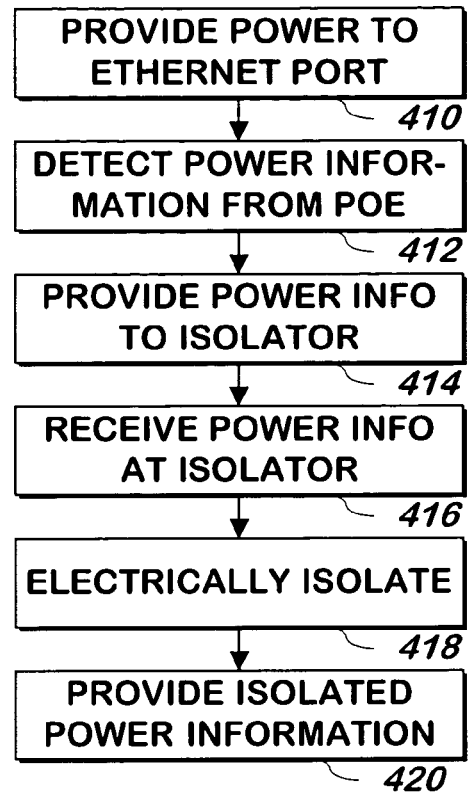
FIG. 4 is a flowchart illustrating a method of providing status information about power provided via the same port as that used for an Ethernet connection according to one embodiment of the present invention.

Referring now to FIG. 4, a method of providing status information about power provided via the same port as that used for an Ethernet connection is shown according to one embodiment of the present invention.

Power is provided 410 to a port such as a conventional Ethernet connector or other connector that also serves to pass Ethernet signals. Information related to the power provided in step 410 is detected 412 as described above and the power information is provided 414 to a device that can electrically isolate it. The power information is received 416 at the device, which electrically isolates 418 the power information and provides the electrically isolated power information 420.

What is claimed is:

1. A method of indicating a configuration for providing power via a communication network connector, comprising:
   receiving configuration information about the power to be provided via the communication network connector, the communication network connector comprising at least one lead to receive network communication signals and at least one lead to receive the power; and
   indicating the configuration information received at least near the communication network connector.

2. The method of claim 1 wherein the communication network connector comprises an RJ-45 connector.

3. The method of claim 1 wherein the network communication signals comprise Ethernet signals.

4. The method of claim 1 wherein the indicating step is performed using at least one lamp.

5. The method of claim 4, wherein the at least one lamp comprises at least one LED.

6. The method of claim 4, wherein at least one of the at least one lamp is used to communicate network status information.

7. The method of claim 4, wherein the indicating step comprises flashing at least one of the at least one lamp.

8. The method of claim 1 wherein the configuration information distinguishes between a power configuration specified by an industry standards organization and a power configuration specified by a corporation, such standards having opposite polarities.

9. The method of claim 1 wherein the indicating step comprises indicating in a first manner responsive to at least one power condition not being detected, and indicating in a second manner responsive to all of at least one power condition being detected.

10. The method of claim 9 wherein:
    the indicating in the first manner step comprises flashing an LED in a color indicating the configuration information; and
    the indicating in the second manner step comprises illuminating steadily an LED in the color indicating the configuration information.

11. A system for indicating a configuration for providing power via a communication network connector, comprising:
    a power sense controller having an input for receiving configuration information about the power to be provided via the communication network connector, the communication network connector comprising at least one lead to receive network communication signals and at least one lead to receive the power, the power sense controller for providing at an output an indicator signal responsive to the configuration information received at the power sense controller input; and
    a display indicator having an input coupled to the power sense controller output for receiving the indicator signal, the display indicator for indicating, at least near the communication network connector, the configuration information received.

12. The system of claim 11 wherein the communication network connector comprises an RJ-45 connector.

13. The system of claim 11 wherein the network communication signals comprise Ethernet signals.

14. The system of claim 11 wherein the display indicator comprises at least one lamp.

15. The system of claim 14, wherein the at least one lamp comprises at least one LED.

16. The system of claim 14, wherein at least one of the at least one lamp is used to communicate network status information.

17. The system of claim 14, wherein the power sense controller provides the indicator signal that can cause the display indicator to flash at least one of the at least one lamp.

18. The system of claim 11 wherein the configuration information distinguishes between a power configuration specified by an industry standards organization and a power configuration specified by a corporation, such standards having opposite polarities.

19. The system of claim 10 wherein the indicator signal has a first state indicating in a first manner responsive to at least one power condition not being detected, and a second state indicating in a second manner responsive to all of at least one power condition being detected.

20. The system of claim 19 wherein:
    the indicator signal in the first state causes the display indicator to flash in a color indicating the configuration information; and
    the indicator signal in the second state causes the display indicator to illuminate steadily in the color indicating the configuration information.

* * * * *